No. 740,378. PATENTED SEPT. 29, 1903.
J. TIMMS.
FRICTION DRAFT GEAR AND BUFFING APPARATUS.
APPLICATION FILED JULY 17, 1902.
NO MODEL. 2 SHEETS—SHEET 1.
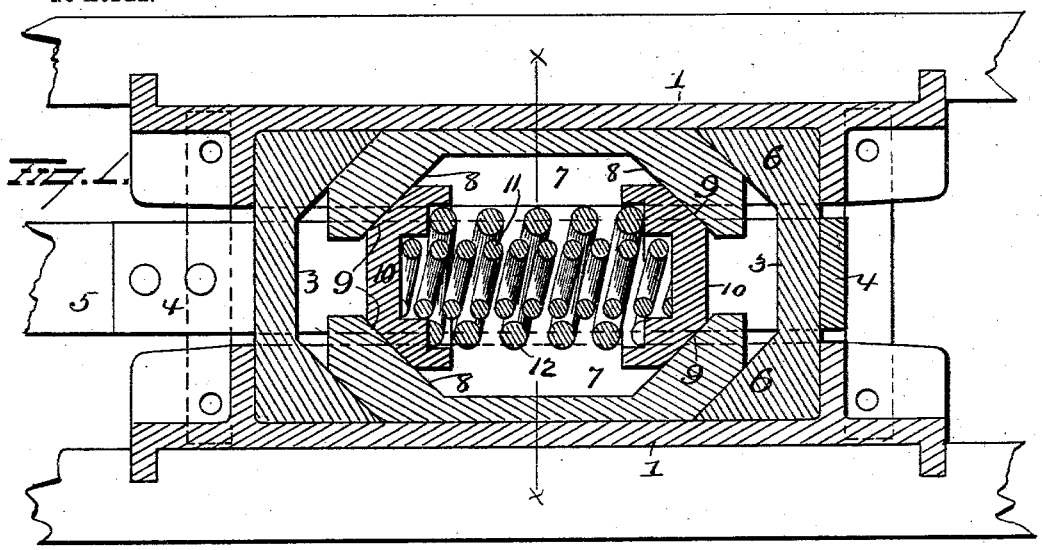
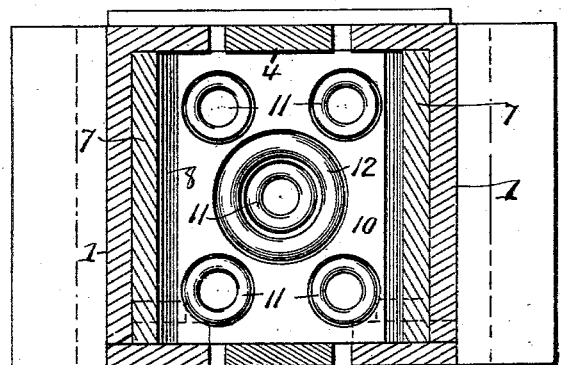
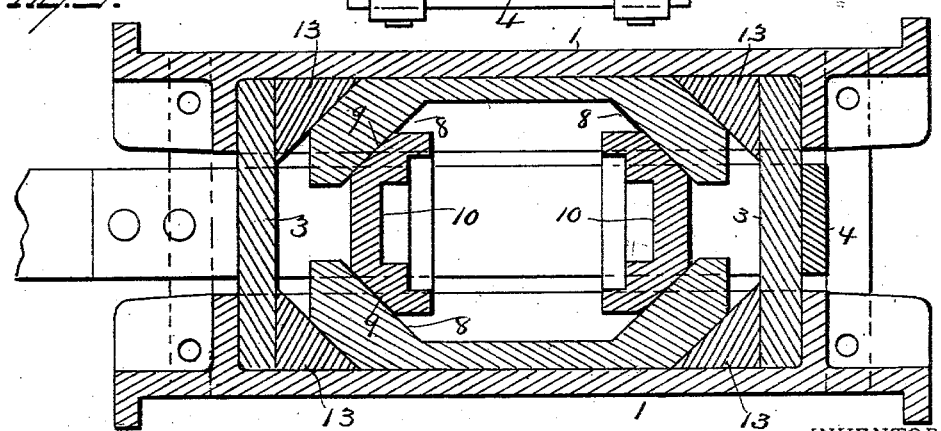
WITNESSES
E. J. Nottingham
G. F. Downing
INVENTOR
James Timms
By H. A. Seymour
Attorney

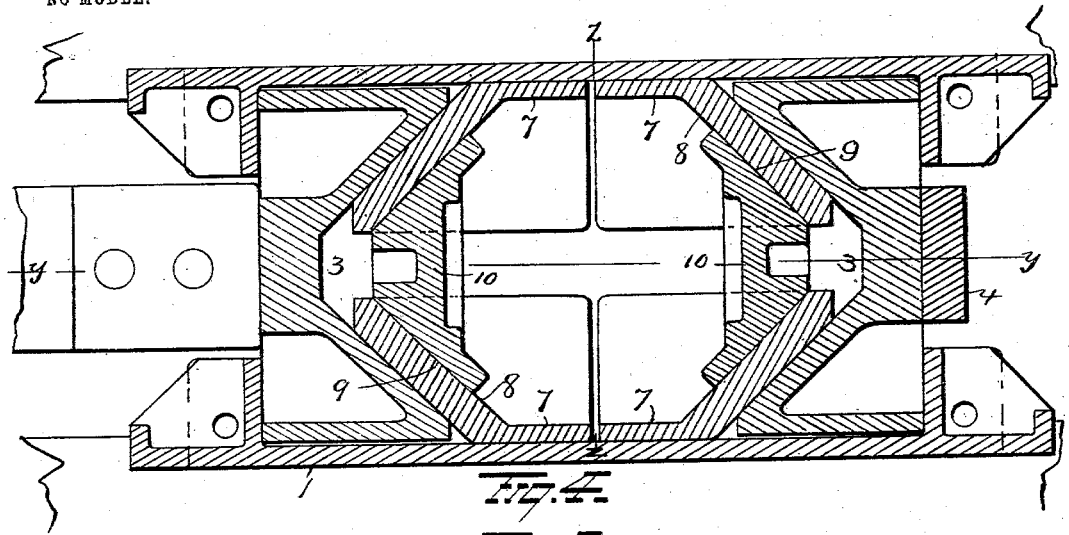
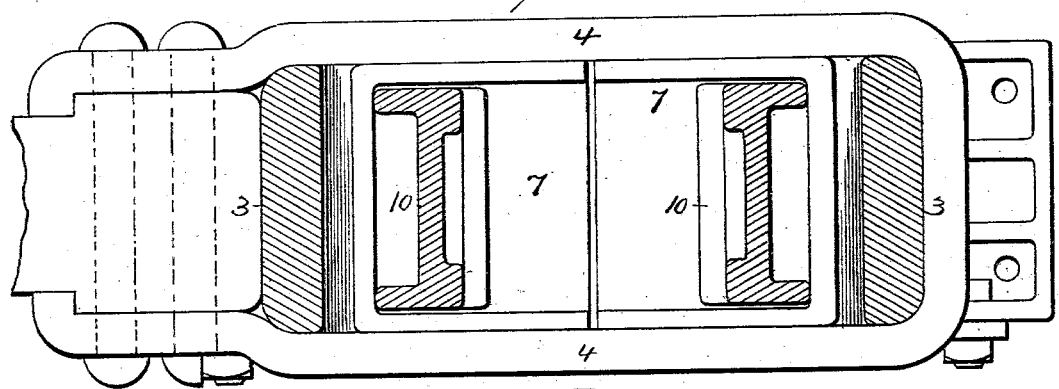
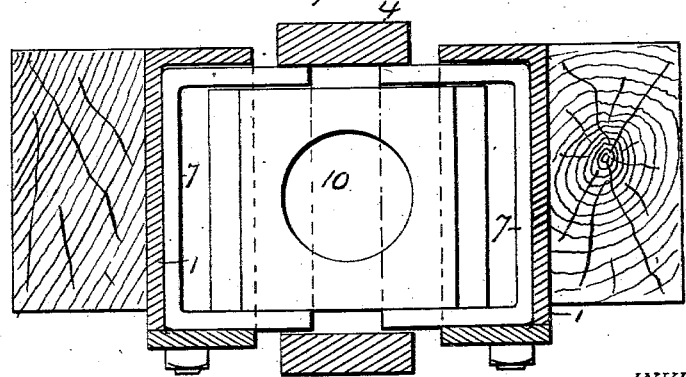

No. 740,378. Patented September 29, 1903.

UNITED STATES PATENT OFFICE.

JAMES TIMMS, OF COLUMBUS, OHIO, ASSIGNOR TO THE BUCKEYE MALLE-ABLE IRON AND COUPLER COMPANY, OF COLUMBUS, OHIO.

FRICTION DRAFT-GEAR AND BUFFING APPARATUS.

SPECIFICATION forming part of Letters Patent No. 740,378, dated September 29, 1903.

Application filed July 17, 1902. Serial No. 115,973. (No model.)

*To all whom it may concern:*

Be it known that I, JAMES TIMMS, a resident of Columbus, in the county of Franklin and State of Ohio, have invented certain new and useful Improvements in Friction Draft-Gear and Buffing Apparatus; and I do hereby declare the following to be a full, clear, and exact description of the invention, such as will enable others skilled in the art to which it appertains to make and use the same.

My invention relates to an improvement in friction draft-gearing and buffing apparatus, the object of the invention being to provide improvements of this character which will be extremely simple in construction, requiring no outside casing to inclose the parts, and which will most effectually perform all the necessary functions of a draft-gear without danger of becoming broken or injured in use.

With this object in view the invention consists in certain novel features of construction and combinations and arrangements of parts, as will be more fully hereinafter described, and pointed out in the claims.

In the accompanying drawings, Figure 1 is a view in longitudinal section, illustrating one form of my invention. Fig. 2 is a view in section on the line $x\ x$ of Fig. 1. Fig. 3 is a view similar to Fig. 1, but showing the same slightly modified. Fig. 4 is a view in longitudinal section of another modified form of my invention. Fig. 5 is a view in section on the line $y\ y$ of Fig. 4, and Fig. 6 is a view in section on the line $z\ z$ of Fig. 4.

1 represents parallel draft-irons secured to the draft-timbers of the car and cast with pockets or seats for end followers 3, around which a yoke-strap 4 is passed and secured to the draw-bar 5 of the coupling. These followers are provided at their opposite ends with projecting beveled blocks or bearing-faces 6, which bear against the beveled ends of friction-plates 7, extending from one follower to the other and made with beveled or inclined bearing-faces 8 at both ends to engage the beveled outer faces 9 of inside follower-plates 10. These inside follower-plates 10 are recessed, forming seats for coiled springs 11 and 12, compressed between them, there being preferably five of the smaller and longer springs 11, located one at each corner of the plates and one at the center, and one of the larger and shorter springs 12, surrounding the central spring 11. The springs serve to hold the inside follower-plates 10 against the beveled or inclined ends of friction-plates 7, pressing the latter apart and holding end followers 3 against the draw-bar 5 and the end of yoke-strap 4 and rest in the seats 2 in draft-irons 1. The operation of this form of my invention is as follows: When there is pressure or a pull upon the draft-gear, one end follower 3 is moved toward the other, the movement of the latter being stopped by seat 2 in draft-irons 1. The beveled or inclined blocks or ends 6 of followers 3, engaging the beveled or inclined ends of friction-plates 7, force them toward each other, and as the inclined inner bearing-faces 8 of friction-plates 7 engage the inclined outer faces of inside follower-plates 10 the latter will be moved toward each other to contract the springs, thus taking up the jar, and the springs will return the parts to their former and normal positions.

In Fig. 3 I have illustrated a slightly-modified form of my invention, in which the beveled blocks or ends 13 of followers 3 are made separate from the plates and held in position by the tension of the springs, the operation of this form of my invention being precisely like that above described.

In Figs. 4, 5, and 6 I have shown another modification, in which the friction-plates 7 are shown divided centrally and spaced a short distance apart to permit of a short longitudinal movement of the coacting elements or sections at each end of the device without any inward contraction of the friction-plates toward each other. This is desirable in instances where the shock or jar is slight and gives to the gear a greater elasticity to relieve light jars.

A great many other slight changes and alterations might be made in the general form and arrangement of the several parts described without departing from the spirit and scope of my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. In a friction draft-gear and buffing apparatus, the combination with two end follower-plates, having beveled faces on one side, each having a limited longitudinal movement, of intermediate members having outside beveled faces contacting with the bevels on the end followers and having a limited transverse movement, of a second set of followers having beveled faces contacting with the inside bevels of the intermediate members, and a spring pressing the second set of followers in opposite directions, substantially as specified.

2. In a friction draft-gear and buffing apparatus, the combination with two end followers having beveled faces on one side, each having a limited longitudinal movement, of intermediate members having outside beveled faces contacting with the bevels on the end followers and having a limited transverse movement, of a second set of followers having beveled faces contacting with the inside bevels of the intermediate members and having a limited longitudinal movement, and springs differing in diameter and length and having their seats in the second set of followers on different planes, substantially as specified.

3. In a friction draft-gear and buffing apparatus, the combination with two end followers having a limited longitudinal movement, of side draft-irons supporting the end followers and adapted to guide and limit their movements, of beveled or inclined blocks at the ends of the end followers and against the draft-irons and having a bearing against both of them, of intermediate friction members having outside bevels contacting with the blocks, of a second set of followers having beveled faces contacting with the inside bevels of the intermediate friction members, and a spring pressing the second set of followers in opposite directions, substantially as specified.

4. In a friction draft-gear and buffing apparatus, the combination of two sets of friction elements, each set comprising inner and outer beveled followers and intermediate beveled members, one set of said friction elements adapted to engage the other when subjected to pressure, and a spring disposed between the inner followers and maintaining the sets of friction elements normally separated.

5. The combination with two followers and two friction-plates, each of which is constructed and arranged to have frictional engagement with each one of the followers and move in a direction transverse to the movement of the follower, of spring-pressed friction-blocks adapted to have frictional engagement with the friction-plates and arranged to move in a direction parallel to the line of movement of the followers, substantially as set forth.

6. In a friction draft-gear and buffing apparatus, the combination with a follower-plate having inside beveled flanges or ends on one side, of a second follower-plate having outside beveled faces, and intermediate friction elements against which the bevels of both follower-plates bear and a spring bearing against the second follower-plate, substantially as specified.

7. In a friction draft-gear and buffing apparatus, the combination of two sets of friction elements, each set comprising inner and outer beveled followers and intermediate beveled members, the intermediate members of the two sets separated a short distance from each other and having a limited longitudinal movement with the followers, and a spring interposed between the inner followers and maintaining the intermediate members of the two sets of elements, normally separated.

8. A draft-gear, comprising draft-irons, followers between them spaced apart and having beveled or inclined engaging ends, friction-plates having beveled ends engaged by the followers to force the plates toward each other, and beveled or inclined on their inner faces at their ends, beveled inside follower-plates against which the beveled or inclined inner faces of the friction-plates bear, and springs between said inside follower-plates.

9. A draft-gear comprising draft-irons, followers between them spaced apart and having beveled or inclined engaging ends, friction-plates having beveled or inclined ends engaged by the followers to force the plates toward each other, and beveled or inclined on their inner faces at their ends, beveled inside follower-plates against the beveled or inclined inner faces of the friction-plates, springs between said inside follower-plates and a yoke-strap passed around said end followers and secured to the draft-bar of the coupling.

10. A draft-gear, comprising draft-irons, followers between the draft-irons, a yoke-strap passed around the followers and secured to the draw-bar of the coupling, inclined bearing-blocks at the ends of said followers, friction-plates having inclined ends engaged by the bearing-blocks to force the friction-plates toward each other, beveled or inclined inside follower-plates engaged by the beveled ends of the friction-plates to force the inside follower-plates toward each other, springs between said inside follower-plates to hold them apart, and seats in the inside follower-plates for the ends of the springs.

11. In a draft-rigging, in combination, a draw-bar, followers having their inner faces recessed the walls of the recess being oblique to the line of draft, side plates having their ends inclined and bearing against the inclined walls of the followers, wedge-blocks having correspondingly-inclined outer faces and bearing against the inner faces of the inclined ends of the side plates, and a spring interposed between the wedge-blocks.

12. In a draft-rigging, in combination, a draw-bar, followers having V-shaped inner faces, a pair of side plates having inwardly-inclined ends interposed between and frictionally engaging the inner faces of the followers, wedge-blocks having their outer faces converging and frictionally engaging the inclined ends of the side plates, and an expansion-spring located between the side plates and seated against the wedge-blocks.

In testimony whereof I have signed this specification in the presence of two subscribing witnesses.

JAMES TIMMS.

Witnesses:
W. A. MARSH,
C. E. ROTH.